United States Patent Office 2,898,932
Patented Aug. 11, 1959

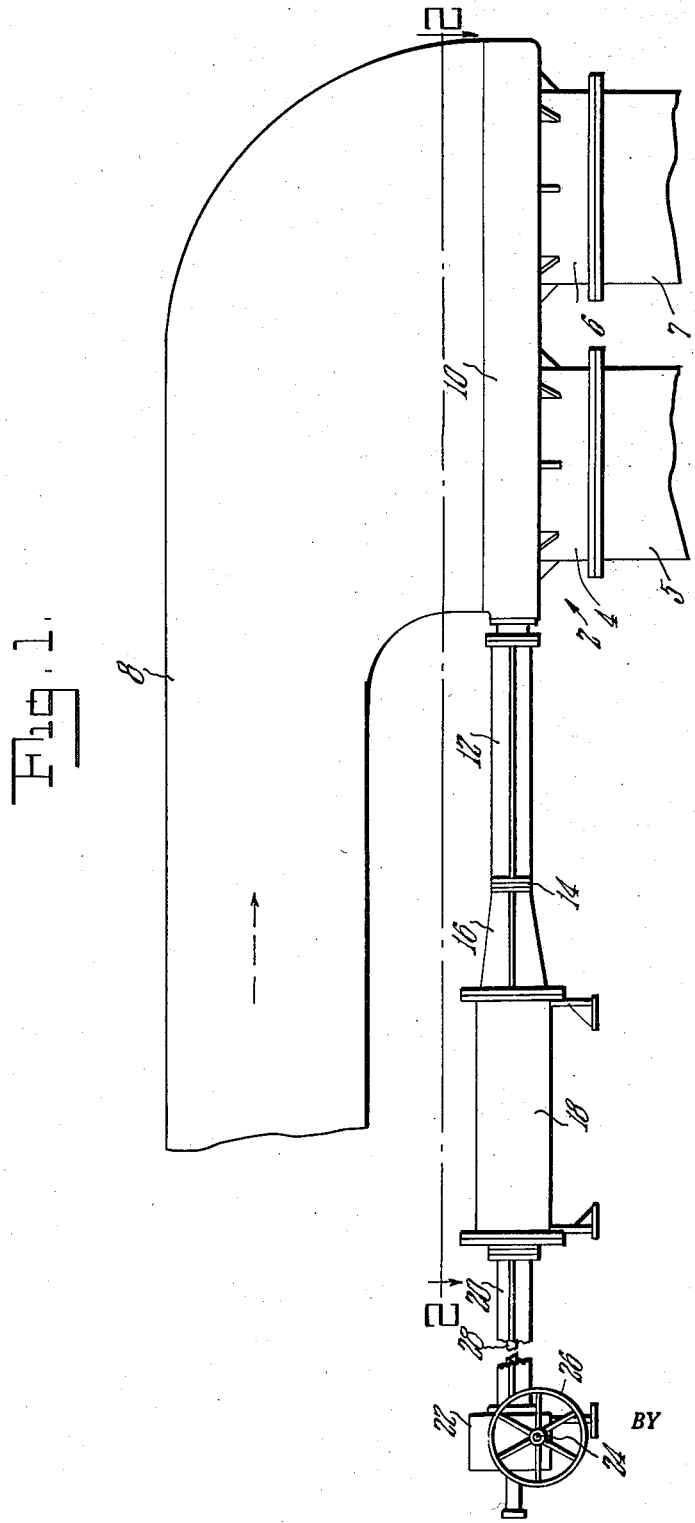

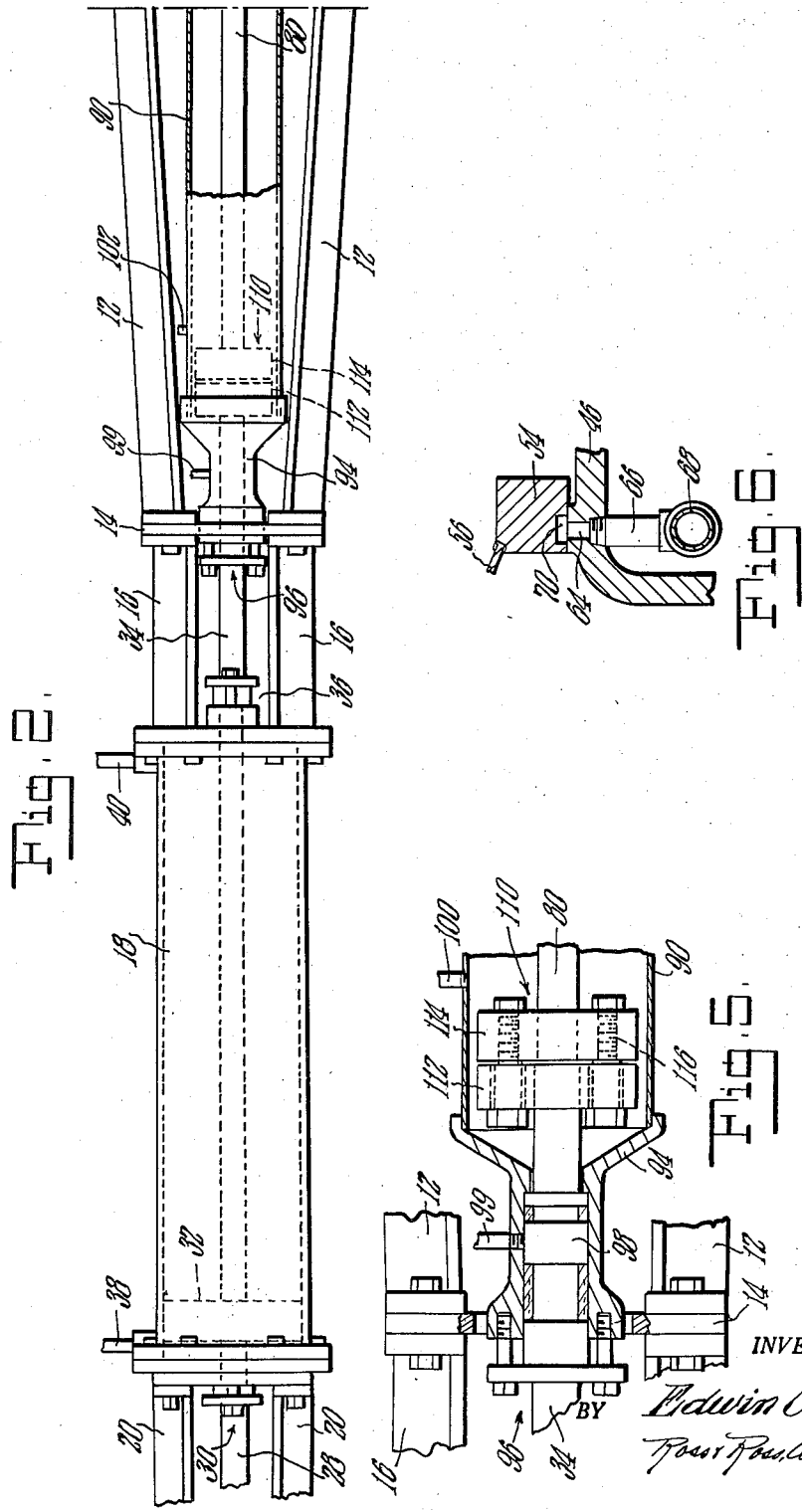

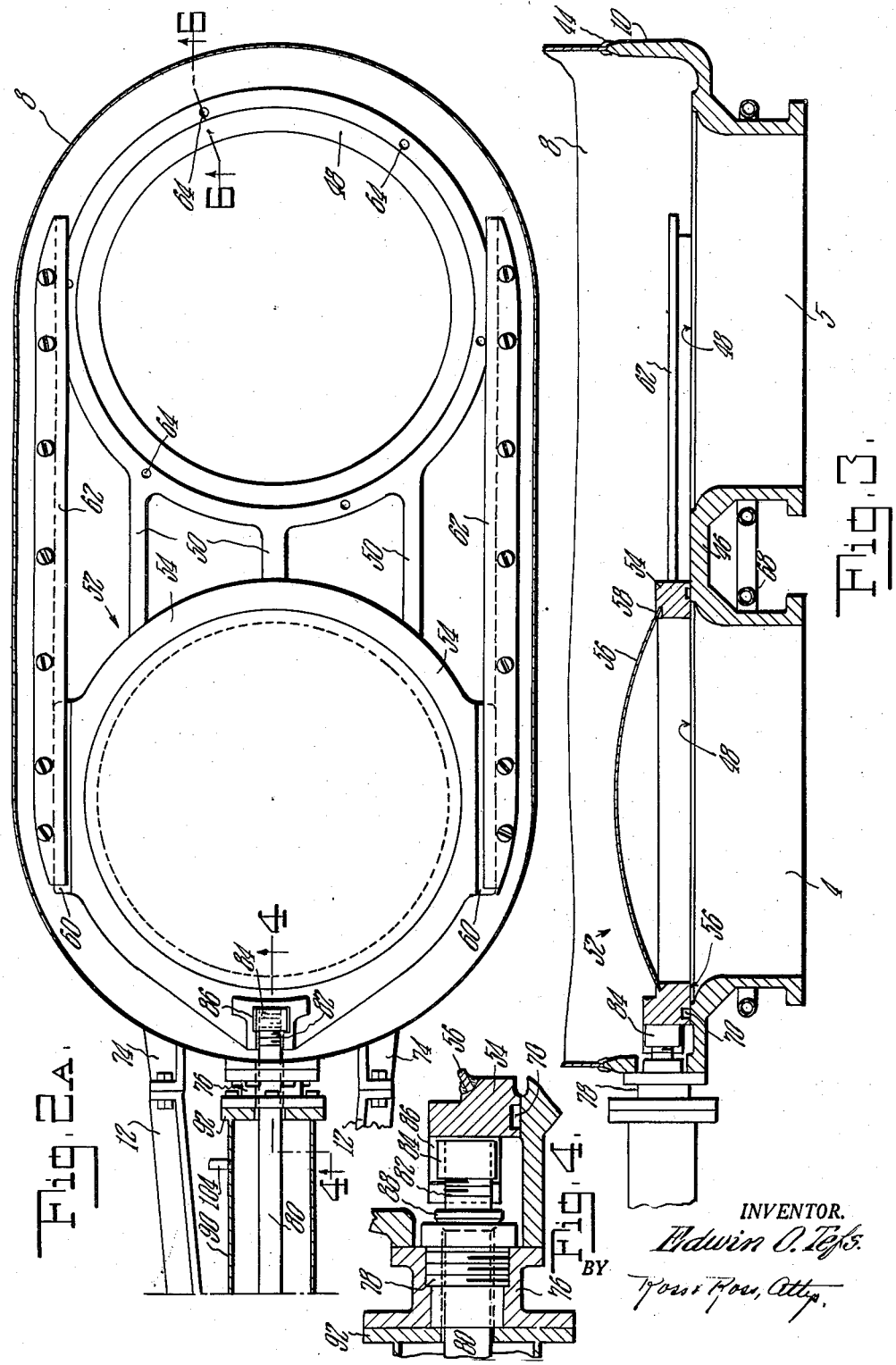

2,898,932

VALVE APPARATUS

Edwin O. Tefs, Springfield, Mass., assignor to The Chapman Valve Manufacturing Company, Indian Orchard, Mass., a corporation of Massachusetts Application April 3, 1956, Serial No. 575,765

2 Claims. (Cl. 137—340)

This invention relates to new and useful improvements in valve apparatus and is directed more particularly to valve apparatus having a pair of separate ports for the selective flow of gas or the like therethrough.

The principal object of the invention is directed to the provision of a valve apparatus having a pair of ports and a slide or gate which is movable relative to the ports so as to close off one or the other of the ports as may be desired.

The novel valve construction of the invention is such that it may be safely used in connection with high temperature gases and it embodies novel features so as to obviate damage and injury thereto as well as to personnel when used in connection with hot gases.

In connection with oil refinery operations, there are hot gases which are normally wasted but which may be used for useful purposes. Such gases may be utilized for boiler operation but, being in a temperature range of 1100° F. to 1200° F. or thereabouts, the boiler fired by such gas requires periodic repairs, reconditioning, replacement of tubes, and the like.

The valve apparatus of the invention is constructed and arranged for the flow of hot gases from the ports thereof alternately to a boiler or to a stack or to alternate boilers. Same is accomplished by means operable to close off either port of the valve. That is, the flow of gas may be shut off to a boiler for a down repairing period while the gas is directed to a stack. Likewise the valve apparatus may control the flow of gas to one boiler while another boiler is down for a reconditioning interval.

It is essential for obvious reasons that hot gases be closed off from a down boiler where men are working in and about said boiler. To that end, novel means is provided to effectively seal the gate and the port to said boiler.

The valve ports of the valve apparatus employed for the purpose described are normally of considerable area, that is, several feet in diameter. Consequently, the valve structure per se is quite massive so as to be affected by high temperatures and temperature changes with the result there is likely to be some elongation and distortion of parts as well as some disalignment thereof.

To overcome the effects of such high temperatures, the reciprocating means of the apparatus for actuating the sliding gate incorporates a flexible joint so that sections of said means may accommodate elongation and misalignment while maintaining an operative condition at all times.

As a further feature of the invention, the valve apparatus is provided with means for cooling that portion of the gate operating means so located as to likely be affected by the high temperatures. This is accomplished by a closed housing or cooling chamber around the operating means.

The apparatus of the invention has capacity for the flow of a large volume of hot gases therethrough and embodies numerous and various novel features of construction which are advantageous in valve apparatus for handling gases of high temperature.

The apparatus will be described in the form at present preferred but it will be understood that various changes and modifications may be made therein without departing from the spirit and scope of the invention.

In the drawings:

Fig. 1 is a small scale side elevational view of valve apparatus embodying the novel features of the invention;

Fig. 2 and 2A are plan views of the apparatus shown in Fig. 1, on the line 2—2 of Fig. 1;

Fig. 3 is a longitudinal sectional elevational view through the valve body shown in Fig. 2A;

Fig. 4 is an enlarged elevational sectional view on the line 4—4 of Fig. 2A;

Fig. 5 is a plan view of the spindle coupling of the valve apparatus shown in Fig. 2; and Fig. 6 is a sectional elevational view of the line 6—6 of Fig. 2A.

Referring now to the drawings more in detail, the invention will be fully described, like numerals referring to like parts in the different figures.

The apparatus will first be described in a general way in connection with Fig. 1 wherein a body 2 of the apparatus has separate ports or outlets 4 and 6 as will later be described. A duct is shown at 8 for conducting hot gases to a wall 10 of the inlet side of the body 2.

Other ducts such as 5 and 7 may be connected to a boiler and to a stack, or both may be connected to separate boilers.

The slide gate within the body to be described may close either one of the ports and open the other for the flow of gas through the selected port.

Where the outlets are connected to a boiler and a stack, gas will flow to the boiler or stack according to the position of the slide gate. Where the outlets are connected to separate boilers, gas will flow to one or the other, all according to the position of the slide gate.

Elongated transversely spaced struts 12 are connected to the body 2 and to a plate 14 which is connected to distance pieces 16 at one end of a cylinder 18.

A yoke construction 20 connects the outer end of the cylinder 18 to a gear box 22 which is of well known form normal in connection with valves and functions to reciprocate the spindle thereof.

The gear box 22 has a rotatable shaft 24 carrying a hand wheel 26. Gearing within the box 22 operatively connects the shaft 24 with a nut in threaded engagement with a spindle 28 for moving the spindle back and forth so as to move the slide gate through other means to be described, relative to the ports of the body.

A stuffing box 30 is provided for the spindle 28 at the outer end of the cylinder 18 and is of any well known form, see Fig. 2. A piston 32 reciprocable in the cylinder 18 has a rod 34 extending through a stuffing box 36 at the inner end of the cylinder.

Connections 38 and 40 are provided for air or hydraulic pressure to act on and to reciprocate the piston 32 and the rod 34.

The piston rod 34 is operatively and flexibly connected to a stem of the slide gate, as will appear, so as to move said gate relative to the ports of the body. The gate may be operated by means of the hand wheel or the piston, as may be desired.

The side wall 10 of the body, as shown in Fig. 3, is welded to the duct 8 at 44 but the connection of the duct and inlet of the body may be flanged or may be otherwise constructed.

The body 2 has a lower wall 46 provided with seats 48 around the ports 4 and 6 and connecting surfaces 50.

A slide gate 52 preferably includes an annular ring 54 having a lower face 56 slidable on the seats 48 and the surfaces 50 and an upper dome 56 formed from sheet metal and welded to the ring around its periphery at 58.

Side portions 60 of the gate are disposed beneath elongated guide members 62. Said guide members are arranged so that the lower face of the gate while slidable on the seats is held more or less snugly thereon by means of the guide members.

Sealing means is provided for the gate and the seats to prevent gases leaking between the gate and seat of the port which is closed by the gate. In case the port closed by the gate is connected to a boiler undergoing reconditioning, personnel in or about said boiler could be subjected to gases by leakage between the gate and seat.

Ports 64 are provided through the lower wall 46 and the seats 48 of the body which are connected by hollow members 66 to a piping system indicated by 68. The lower face of the gate is provided with an annular groove 70 which overlies the ports 64 of the seat over which the gate is disposed. Steam is directed through the ports 64 into the groove 70 of the gate so as to seal the gate and seat and to prevent the leakage of gas past the gate.

The members 12 are secured to body members 74, as in Fig. 2A. A spacer 76 is connected to the body and has a packing collar 78 therein. See Fig. 4.

A stem 80 reciprocable in the packing collar has a threaded end 82. A nut 84 in threaded engagement with the stem is received somewhat loosely in a socket 86 of the ring 54 of the gate. A collar 88 fixed on the stem 80 abuts the packing collar in position of the gate, as shown in Fig. 4.

A tubular member 90 has a flange 92 at the inner end thereof secured to the spacer 76 and extends away from the body and about the stem 80. A cap member 94 is secured to the outer end of the tubular member 90 and at its outer end is provided with a stuffing box 96 through which piston rod 34 is reciprocable, as shown in Fig. 5. A device 98 known as a lantern gland surrounds the rod 34 and a connection 99 to the cap 94 offers pressure to the gland which is adapted for sealing around the rod 34.

The member 90 is provided with connections 102 and 104 for the circulation of a cooling medium which may be steam within say a temperature range of 200 to 400° F. In this way, the piston rod and the stem are cooled.

The coupling for the piston rod 34 and stem 80 is shown at 110 in Fig. 5 and includes members 112 and 114 secured on adjacent ends of the piston rod and stem. Bolts 116 are secured in the member 114 and the parts are arranged so that the rod and stem may move axially relative to one another and out of axial alignment slightly.

The bolting for the flanges of the components of the apparatus has been omitted in certain of the figures for clarity but it will be understood that bolting for flanges well known in the art will be used.

It will be observed that the slide gate may be moved for the flow of gas through the port selected and that said gate may be operated manually by means of the gear box or through the cylinder and piston pressure means.

To provide for such misalignment or expansion and contraction the piston rod and stem of the gate are flexibly connected and the stem, coupling and portion of the piston rod are enclosed in a cooling chamber to overcome distortion and other effects brought about by high temperature and temperature changes.

Sealing means is provided for the gate in its position over a port to seal against the flow of gases into a port closed by the gate to obviate gas flowing into a boiler in or about which men may be working.

The invention has been disclosed in the form thereof at present preferred but it will be understood that changes and modifications may be made in the apparatus without departing from the spirit and scope thereof and therefore it is desired to claim and secure by Letters Patent of the United States the following:

1. Valve actuating mechanism comprising in combination, a valve body, a stem extending from said valve body, an elongated tubular member for surrounding said stem having an outer end and an inner end secured to the side of said body around said stem, said tubular member having an internal diameter relatively larger than that of the diameter of said stem to be surrounded thereby to provide a space around said stem, a pair of elongated struts at opposite sides of said tubular member having outer ends and inner ends secured to the side of said body at opposite sides of said tubular member, a cross plate having an aperture therethrough connecting the outer ends of said struts together, a structure extending in said aperture adjacent the outer ends of said struts secured to and closing the outer end of the tubular member and including means packing the rear end portion of a reciprocable rod extending therethrough into said tubular member and connected to the outer end of said stem whereby the outer end of said stem may be supported and guided thereby.

2. Valve actuating mechanism comprising in combination, a valve body, a stem extending from said valve body, an elongated tubular member for surrounding said stem having an outer end and an inner end secured to the side of said body around said stem, said tubular member having an internal diameter relatively larger than that of the diameter of said stem to be surrounded thereby to provide a space around said stem, a pair of elongated struts at opposite sides of said tubular member having outer ends and inner ends secured to the side of said body at opposite sides of said tubular member, a cross plate having an aperture therethrough connecting the outer ends of said struts together, a structure extending in said aperture adjacent the outer ends of said struts secured to and closing the outer end of the tubular member and including means for packing the rear end portion of a reciprocable rod extending therethrough into said tubular member and connected to the outer end of said stem whereby the outer end of said stem may be supported and guided thereby, said tubular member provided with inlet and outlet means for the circulation of cooling means through the space around said stem.

References Cited in the file of this patent

UNITED STATES PATENTS

| | | |
|---|---|---|
| 723,801 | Rauchenberg | Mar. 24, 1903 |
| 1,545,696 | Riley | July 14, 1925 |
| 1,826,941 | LaMont | Oct. 13, 1931 |
| 2,048,696 | Hellan | July 28, 1936 |
| 2,155,315 | Kremers | Apr. 18, 1939 |
| 2,360,389 | Bergman | Oct. 17, 1944 |
| 2,622,617 | Sederquist | Dec. 23, 1952 |
| 2,742,924 | Harter | Apr. 24, 1956 |
| 2,764,943 | Peters | Oct. 2, 1956 |

FOREIGN PATENTS

| | | |
|---|---|---|
| 305,812 | Germany | May 24, 1918 |
| 941,632 | France | July 26, 1948 |